(12) United States Patent
Seguchi

(10) Patent No.: US 9,876,455 B2
(45) Date of Patent: Jan. 23, 2018

(54) FIELD WINDING TYPE SYNCHRONOUS MACHINE

(71) Applicant: DENSO CORPORATION, Kariya, Aichi-pref. (JP)

(72) Inventor: Masahiro Seguchi, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 15/154,268

(22) Filed: May 13, 2016

(65) Prior Publication Data

US 2016/0336891 A1    Nov. 17, 2016

(30) Foreign Application Priority Data

May 13, 2015    (JP) .................................. 2015-098206

(51) Int. Cl.
| | |
|---|---|
| H02P 1/46 | (2006.01) |
| H02P 1/50 | (2006.01) |
| H02P 25/03 | (2016.01) |
| H02K 19/12 | (2006.01) |
| H02K 19/28 | (2006.01) |

(52) U.S. Cl.
CPC ............. *H02P 25/03* (2016.02); *H02K 19/12* (2013.01); *H02K 19/28* (2013.01); *H02K 2201/03* (2013.01); *H02P 2207/05* (2013.01)

(58) Field of Classification Search
CPC .......... H02K 1/278; H02K 3/26; H02K 23/26; H02K 19/12; H02K 19/28; H02P 25/03
USPC .......................................... 310/254; 318/716
See application file for complete search history.

(56) References Cited

U.S. PATENT DOCUMENTS

| | | | | | |
|---|---|---|---|---|---|
| 2,685,057 | A | * | 7/1954 | Gilchrist | ................... H02J 7/22 310/224 |
| 2006/0290316 | A1 | * | 12/2006 | Seguchi | ................. H02K 19/28 318/720 |
| 2007/0046138 | A1 | * | 3/2007 | Ooiwa | ................... H02K 15/03 310/263 |
| 2008/0079375 | A1 | | 4/2008 | Seguchi | |

(Continued)

FOREIGN PATENT DOCUMENTS

| | | | |
|---|---|---|---|
| JP | 2008178211 | * | 7/2008 |
| JP | 2010-022185 | A | 1/2010 |
| JP | 2010022185 | * | 1/2010 |

(Continued)

*Primary Examiner* — Bentsu Ro
*Assistant Examiner* — Zemenay Truneh
(74) *Attorney, Agent, or Firm* — Oliff PLC

(57) ABSTRACT

A field winding type synchronous machine has a stator having a stator core to which a stator coil is wound, and a rotor that rotates while facing a peripheral surface of the stator with an electromagnetic gap therebetween. The rotor includes a rotor core having a plurality of main pole portions and interpole portions, main pole windings wound around the main pole portions, interpole windings wound around the interpole portions, and a full-wave rectifier circuit for energizing the field current to the main pole windings. The interpole windings produce the induced current by a magnetic flux generated by a time harmonic current superimposed on a fundamental wave of the stator coil. The electromagnetic gaps between the interpole portions and a circumferential surface of the stator are configured larger than electromagnetic between the main pole portions and the circumferential surface of the stator.

17 Claims, 9 Drawing Sheets

(56) References Cited

U.S. PATENT DOCUMENTS

2014/0285057 A1 9/2014 Aoyama
2015/0194855 A1 7/2015 Kubo et al.

FOREIGN PATENT DOCUMENTS

| JP | 2015-015846 A | | 1/2015 |
| --- | --- | --- | --- |
| JP | 2015015846 | * | 1/2015 |
| JP | 2015-023767 A | | 2/2015 |
| JP | 2015023767 | * | 2/2015 |

* cited by examiner

INFLUENCE BY GAP DISTANCE OF INTERPOLE MAGNETIC PATH

FIELD WINDING TYPE SYNCHRONOUS MACHINE

CROSS-REFERENCE TO RELATED APPLICATION

This application is based on and claims the benefit of priority from earlier Japanese Patent Application No. 2015-98206 filed May 13, 2015, the description of which is incorporated herein by reference.

TECHNICAL FIELD

The present disclosure relates to a field winding type synchronous machine used as an electric motor, a generator, or a motor-generator mounted on a vehicle, for example.

BACKGROUND

Conventionally, as a synchronous machine mounted and used on a vehicle, various machines having a stator with a stator core to which a stator coil made of a plurality of phase windings for forming a rotating magnetic field is wound, and a rotor that rotates while facing a peripheral surface of the stator with an electromagnetic gap therebetween are known.

As a kind of the synchronous machine, a field winding type synchronous machine is disclosed in the Japanese Patent Application Laid-Open Publication No. 2008-178211.

The field winding type synchronous machine mentioned above has a rotor. The rotor has a rotor core having a plurality of main pole portions that cause a magnetic flux to flow to a stator core. The main pole portions are spaced apart by a predetermined electrical angle pitch from each other and project toward the stator. The rotor also has main pole windings wound around each of the main pole portions of the rotor core to produce the flux.

Although this field winding type synchronous machine is producing torque by interlinking an exciting magnetic flux directly with the main pole portions of the rotor core to excite the main pole windings, there is a problem that torque ripple becomes large.

In addition, other field winding type synchronous machines are disclosed also in Japanese Patent Application Laid-Open Publication Nos. 2010-22185, 2015-15846, and 2015-23767.

Each of these field winding type synchronous machines has interpole portions and interpole windings. The interpole portions project toward the stator and are spaced apart at roughly 90 degrees in electrical angle with respect to main pole portions of the rotor core. The interpole windings are wound around the interpole portions and produce an induced current by harmonic currents superimposed on a magnetic flux generated by the stator coil.

These field winding type synchronous machines produce torque by inducing an excitation current generated in the stator coil in the interpole windings disposed between the main pole portions, and supplying the induced current to the main pole windings.

In these cases, the torque ripples are small; however, since the induced current harmonic currents, caused by the interpole portions which are saturated at maximum load, are small, there is a problem that sufficient torque cannot be generated.

SUMMARY

An embodiment provides a field winding type synchronous machine that can produce a large torque at maximum load A field winding type synchronous machine in an aspect includes a stator having a stator core having a stator coil formed of a plurality of distributed phase windings that forms a rotating magnetic field, and a rotor that rotates while facing a peripheral surface of the stator with an electromagnetic gap therebetween.

The rotor includes a rotor core having a plurality of main pole portions projecting toward the stator that are spaced apart by a predetermined electrical angle pitch from each other, the main pole portions making a field magnetic flux flow to the stator core, and a plurality of interpole portions projecting toward the stator that are spaced apart at roughly 90 degrees in electrical angle with respect to the main pole portions.

The rotor further includes main pole windings wound around the main pole portions to form the field magnetic flux, interpole windings wound around the interpole portions to produce an induced current, and a rectifier circuit that rectifies the induced current to a field current and energizes the field current to the main pole windings.

The interpole windings produce the induced current by a magnetic flux generated by a time harmonic current superimposed on a fundamental wave of the stator coil, and electromagnetic gaps between the interpole portions and a circumferential surface of the stator are configured larger than electromagnetic gaps between the main pole portions and the circumferential surface of the stator.

According to the above configuration, the interpole winding is intended to produce an induced current by a magnetic flux generated by a time harmonic current superimposed on a fundamental wave of the stator coil, and the electromagnetic gap of the interpole portion facing the peripheral surface of the stator is made larger than the electromagnetic gap of the main pole portion.

Therefore, since it is possible to prevent the interpole portions from being saturated at maximum load, it is possible to advance the production of the induced current by the time harmonic current to the interpole windings wound on the interpole portions.

Thus, it is possible to produce much larger torque at maximum load.

In the present disclosure, it is assumed that the stator coil is wound around the stator core by distributed winding.

Hereinafter, points different from a stator coil that is assumed to be wound by concentrated winding as disclosed in Japanese Patent Application Laid-Open Publication Nos. 2015-15846 and 2015-23767 will be described.

When the stator coil uses concentrated winding, a distribution of the coil does not become a sine wave, the distribution is divided into three equal parts including the N and S directions, and a rotary magnetic flux distribution is formed by the three phase currents.

Therefore, a large low-order component (third order, fifth order) is included in a fundamental wave (first order) in a stator gap, and since the number of divisions (mainly 3) of the magnetic circuit is also vague, the magnetic flux distribution is greatly distorted and has large components of the low order harmonics.

When the rotor starts rotating in this situation, the magnetic flux distribution starts to move also in the rotational direction due to the current of the stator coil mentioned earlier.

At this time, since the changes in the rotational directions of the magnetic flux distribution in the coil and the magnetic circuit are not uniform as described above and the low-order harmonic components flow in the concentrated winding, even when a certain fundamental wave energization is performed, a magnetic flux linking with the rotor field winding varies due to low-order harmonics accompanying the rotating magnetic field of the stator, and thereby an uneven current is excited to the field winding.

From the above, the exciting current to the rotor field winding wound by the concentrated winding is proportional to the rotational speed of the rotor, and on the contrary the exciting current hardly flows when the rotor is stopped or rotating at extremely low speed.

Further, since the flux linkage change accompanying the rotation is used, the excitation current is proportional to the rotational speed, and cannot be controlled with other factors or means.

On the contrary, when the stator coil is a distributed winding, with respect to the rotational direction, no low-order harmonic distortions are present in the winding or the magnetic flux distribution, and most of the change in flux linkage accompanying the rotation is high order because of the magnetic variation caused by a multi-slot structure, and since it is also designed to reduce the variation, the amount of excitation originating from this is low.

Therefore, in order to increase the amount of excitation, the excitation current is induced to the rotor coil by varying the flux linkage to the rotor side by varying the amplitude of the magnetic flux distribution of the fundamental wave.

For that purpose, the time harmonics are superimposed on the fundamental wave of the stator current.

Thus, it is possible to obtain the required excitation current by inputting the time harmonics having amplitude proportional to the required exciting force irrespective of the rotational speed.

As described above, in the cases of the Publications Nos. 2015-15846 and 2015-23767, an excitation method assumes spatial harmonics.

Further, since the previously-known excitation method of the rotor field winding is a method proportional to the rotational speed as described above, the rotor field winding is hardly excited when the rotational speed is low or when rotation is stopped.

Furthermore, since the previously-known excitation method of the rotor field winding is proportional to the rotational speed, the excitation tends to be over-excited during a high rotational speed conversely, and this method is not suitable when it is desired to control the field in the whole range of the rotational speed.

In contrast, in the present disclosure, in the method of superimposing the harmonics on the fundamental wave current, excitation of the rotor field winding is possible even at low rotation speed or when rotation is stopped, and it is useful in rotary machines in hybrid or electric vehicles where a wide range of rotational speed is required.

DETAILED DESCRIPTION OF THE PREFERRED EMBODIMENTS

Hereinafter, embodiments of a field winding type synchronous machine according to the present disclosure will be described in detail with reference to the accompanying drawings.

First Embodiment

A field winding type synchronous machine of an armature winding feeding system according to a first embodiment will be described with reference to FIGS. 1 to 5.

The field winding type synchronous machine of the first embodiment is an example of applying the present disclosure to a motor-generator for a vehicle.

It should be noted that, in the first embodiment, a hybrid vehicle that uses batteries and an engine to provide driving force, a battery-powered electric car, a fuel cell vehicle, etc., are regarded as relevant vehicles.

Figure 1:
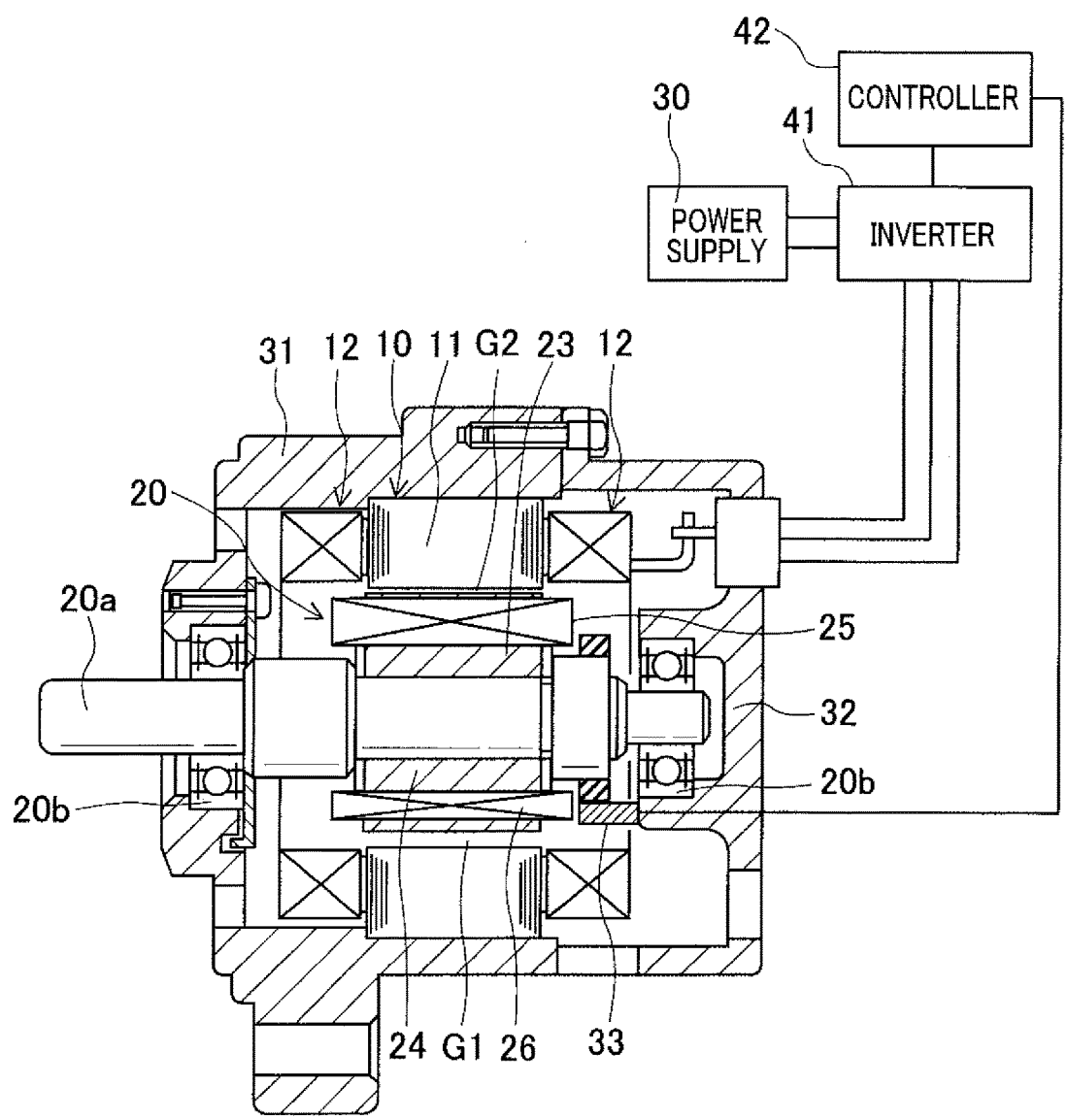
FIG. 1 shows a sectional view taken along an axial direction of a field winding type synchronous machine according to a first embodiment.

FIG. 1 is a sectional view of a field winding type synchronous machine (hereinafter simply referred to as a motor-generator) a taken along an axial direction.

The motor-generator is configured by including a stator 10 having a stator core 11, a stator coil (armature winding) 12 wound around the stator core 11, a rotor 20 having a rotor core 21, main pole windings (field windings) 25 and interpole windings (field windings) 26 wound around main pole portions 23 and interpole portions 24 of the rotor core 21, respectively, a rotor shaft 20a, frames 31, 32, a position sensor 33, and the like.

The stator 10 is accommodated in the frames 31, 32 and fixed thereto.

The rotor 20 is rotatably supported by the frames 31, 32 via bearings 20b.

The position sensor 33 is disposed facing an outer peripheral surface of a magnetic ring plate. The magnetic ring plate is formed with magnetic poles fixed to the rotor shaft 20a at a constant pitch in a circumferential direction.

The position sensor 33 detects a rotational position of the rotor 20 by detecting a passage of the magnetic poles.

The field winding type synchronous machine of the above configuration is controlled and driven by an inverter 41, a controller 42, and a power supply 30.

The inverter 41 applies a voltage from the power supply 30 to the stator coil 12 based on signals outputted from the position sensor 33 and the controller 42.

The stator coil 12 has three-phase distributed windings, and the inverter 41 applies the voltage to three-phase windings such that a desired rotating magnetic field is produced from the stator coil 12.

The controller 42 intermittently controls the inverter 41 so as to supply a stator current corresponding to the rotational position of the rotor 20 obtained from the position sensor 33 to the stator coil 12.

Figure 2:
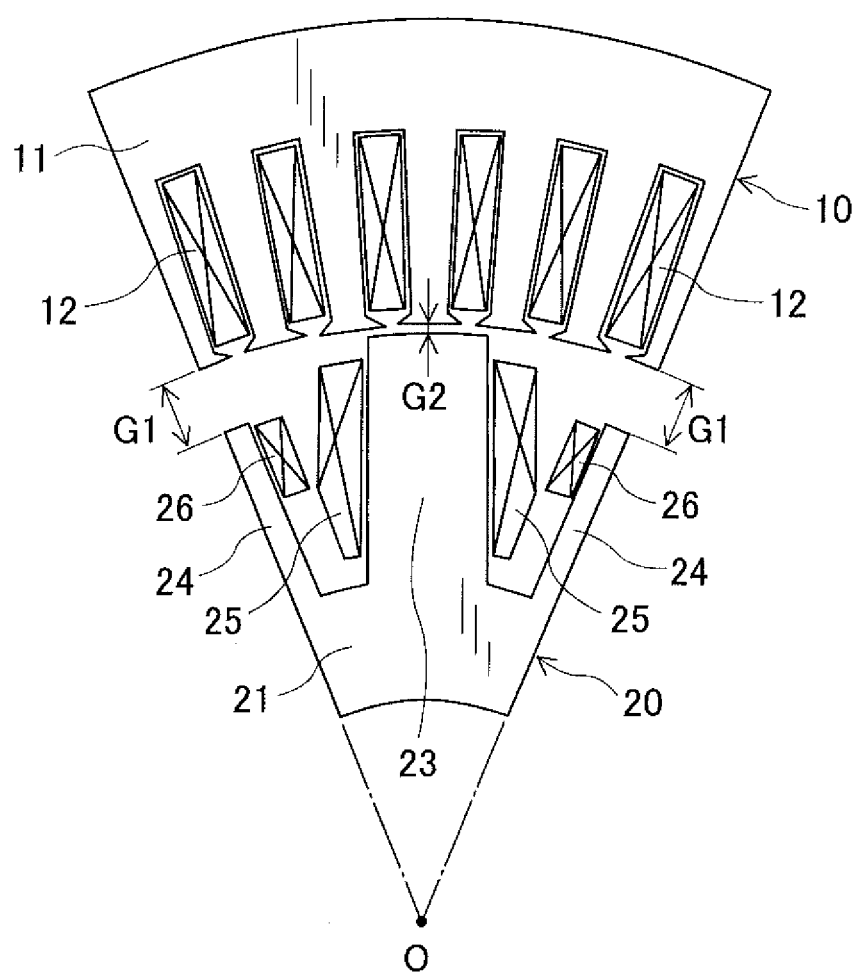
FIG. 2 shows a sectional view of a stator and a rotor of one magnetic pole taken along a direction perpendicular to an axis of the stator and the rotor according to the first embodiment.

As shown in FIG. 2, the rotor core 21 is disposed coaxially with the stator 10 facing an inner circumferential surface of the stator 10 with a predetermined electromagnetic gap.

The rotor core 21 includes a plurality of pairs of main pole portions 23 (four pairs in the first embodiment) and a plurality of pairs of interpole portions 24 (four pairs in the first embodiment). The main pole portions 23 and interpole portions 24 project toward the stator 10 from an outer peripheral surface of the rotor core 21.

The main pole portions 23 constituting field poles are projecting toward the stator 10 spaced apart from each other at a predetermined electrical angle pitch, and exchange field magnetic flux with the stator core 11.

The interpole portions 24 project toward the stator 10 and are spaced apart about 90 degrees in electrical angle with respect to main pole portions 23.

That is, the interpole portions 24 are disposed one by one on a q-axis between the two main pole portions 23 adjacent in the circumferential direction.

In the present embodiment, projecting distal ends of the interpole portions 24 are positioned in a rotor rotation axis O side in a radial direction more than projecting distal ends of the main pole portions 23.

Accordingly, an electromagnetic gap G1 between the interpole portion 24 and the inner circumferential surface of the stator 10 is configured larger than an electromagnetic gap G2 between the main pole portion 23 and the inner circumferential surface of the stator 10.

That is, by the electromagnetic gap G1 between the interpole portion 24 and the stator 10 being made large, the magnetic flux (φ) originated from an AT (main current) of the stator coil 12 is made difficult to flow in the interpole part 24 positioned on the q-axis magnetic path.

Thereby, the magnetic flux saturation in the interpole portion 24 is relieved.

The main pole windings 25 connected in series are wound around the respective main pole portions 23.

Further, the interpole windings 26 connected in series are wound around the respective interpole portion 24.

Figure 3:
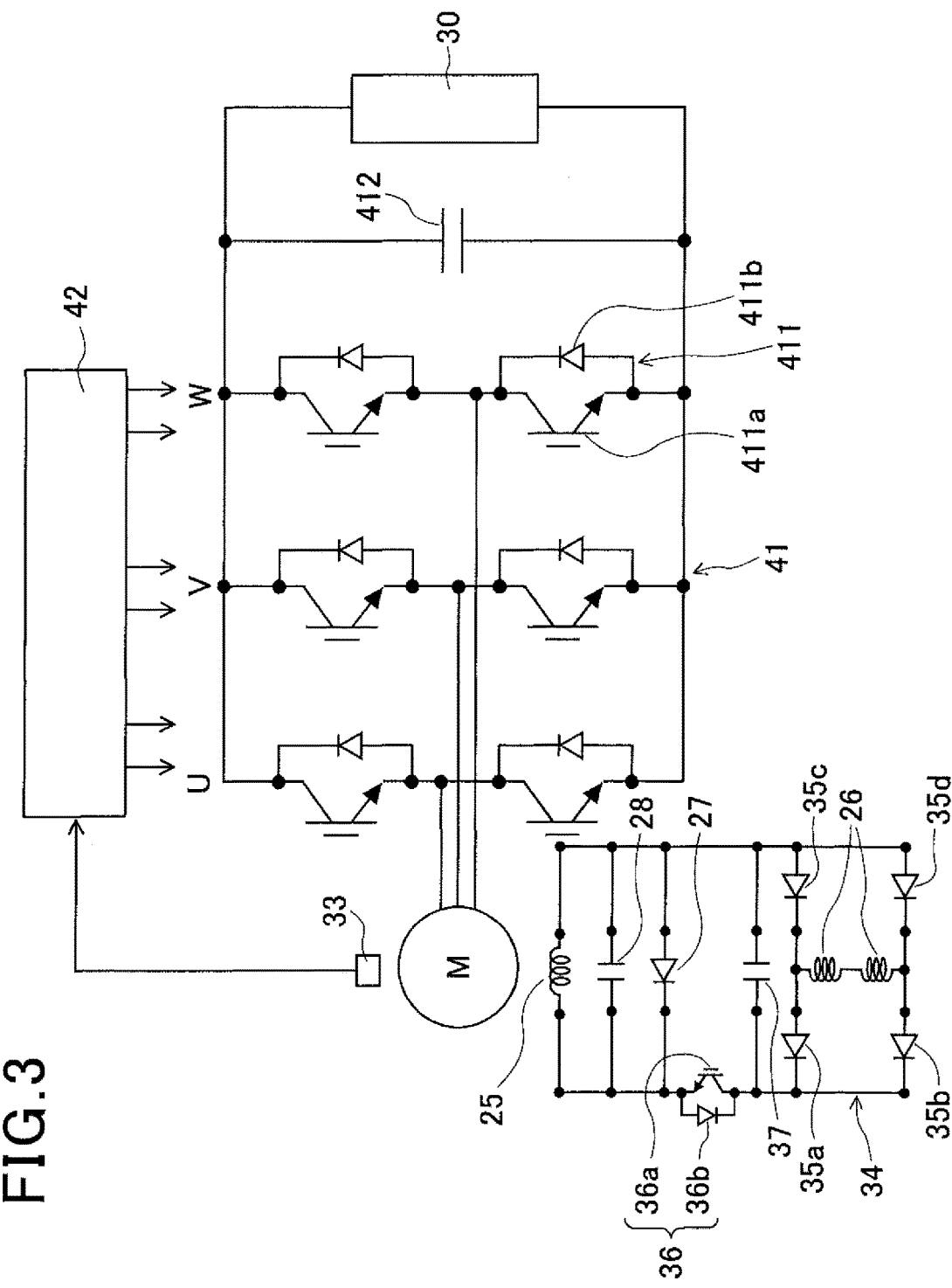
FIG. 3 shows a circuit diagram of the field winding type synchronous machine according to the first embodiment.

An electric circuit of the field winding type synchronous machine configured as above will be described with reference to FIG. 3.

The 3-phase inverter 41 has a total of three upper arm elements 411 and a total of three lower arm elements 411.

Each arm element 411 is constituted by an insulated gate bipolar transistor (IGBT) 411a and a flywheel diode 411b.

Note that each arm element 411 may be substituted by other transistors such as a MOS field-effect transistor.

Alternating current induced to the main pole windings 25 is half-wave rectified by a diode 27, excites one of a pair of main pole portions 23 to an N pole and excites other one to an S pole.

Note that the half-wave rectified alternating current is smoothed by a smoothing capacitor 28, and its pulsation is reduced.

Incidentally, another smoothing capacitor 412 is for smoothing the alternating current in the power supply 30 side.

A field circuit that forms the field magnetic flux is configured by the interpole windings 26, a full-wave rectifier circuit 34, and the main pole windings 25, and is fixed or wound around the rotor core 21.

The full-wave rectifier circuit 34 is constituted by diodes 35a to 35d which are fixed to the rotor shaft 20a, for example.

The full-wave rectifier circuit 34 full-wave rectifies an induced current of the interpole windings 26.

The interpole windings 26 wound around the interpole portions 24 produce the induced current by a q-axis harmonic magnetic flux generated by a q-axis harmonic current component in a time harmonic current superimposed on a fundamental wave of the stator coil 12.

A DC current full-wave rectified by the full-wave rectifier circuit 34 is applied to the main pole windings 25.

That is, the q-axis harmonic current component of the stator coil 12 produces the induced current in the interpole windings 26, and the induced current is full-wave rectified and applies the field current to the main pole windings 25.

Note that a half-wave rectifier circuit may be used instead of the full-wave rectifier circuit 34.

Then, a switching element 36 and another smoothing capacitor 37 are disposed between the full-wave rectifier circuit 34 and the main pole windings 25.

Thereby, a voltage required to excite the main pole windings 25 is produced by the switching element 36 and the smoothing capacitor 37.

That is, the excitation current flowing in the main pole windings 25 is ensured by first turning the switching element 36 off, then turning the switching element 36 on when the smoothing capacitor 37 is equal to or higher than a desired voltage in the present embodiment.

Since there is an L component in the main pole windings 25, a voltage is required in order to apply the current in a short period of time, thus a charge is stored in the smoothing capacitor 37 by once turning the switching element 36 off and increases an applied voltage.

Thus, it is possible to increase the exciting current by effectively increasing the voltage that can be applied to the main pole windings 25.

Note that the switching element 36 is constituted by an insulated gate bipolar transistor (IGBT) 36a and a flywheel diode 36b.

Note that the switching element 36 may be substituted by other transistors.

Although switching on and off of the switching element 36 is performed by detecting the voltage of the capacitor 37, an amount of excitation is controlled by the controller 42.

As described above, according to the field winding type synchronous machine of the present embodiment, the electromagnetic gap G1 between the interpole portion 24 and the inner circumferential surface of the stator 10 is configured larger than the electromagnetic gap G2 between the main pole portion 23 and the inner circumferential surface of the stator 10, thus the electromagnetic gap G1 between the interpole portion 24 and the stator 10 is large.

Thereby, the magnetic flux (φ) originated from the AT (main current) of the stator coil 12 is made difficult to flow in the interpole part 24 positioned on the q-axis magnetic path.

As a result, it is possible to relieve the magnetic flux saturation in the interpole portion 24.

Therefore, since a magnetic flux change in the interpole portion 24 is increased by a pulsating current, and it is possible to accelerate the production of the exciting current to the interpole windings 26 wound on the interpole portions 24, much larger torque can be produced.

Further, the switching element 36 and the smoothing capacitor 37 are disposed between the full-wave rectifier circuit 34 and the main pole windings 25 in the present embodiment.

Thus, charge is stored in the smoothing capacitor 37 by once turning the switching element 36 off, and it is possible to increase the voltage applied to the main pole windings 25.

Therefore, it is possible to increase the exciting current by effectively increasing the voltage that can be applied to the main pole windings 25.

As a result, it is possible to improve torque.

Figure 4:
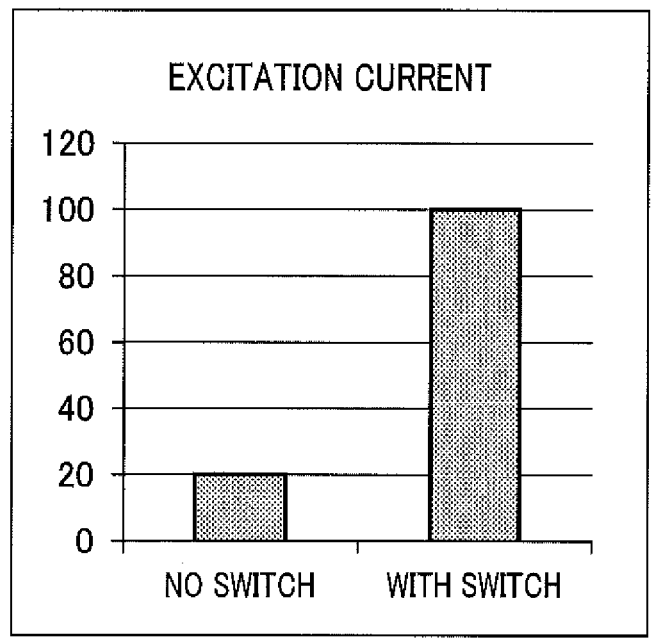
FIG. 4 shows a graph comparing an excitation current in cases where a switching element is provided and not provided in the field winding type synchronous machine according to the first embodiment.

Note that when a magnitude of the exciting current is examined in cases of disposing, as in the embodiment 1, and not disposing the switching element 36 and smoothing capacitor 37, results shown in FIG. 4 were obtained.

As apparent from FIG. 4, it is found that the exciting current in the case of disposing the switching element 36 or the like is about 5 times more as compared with the case of not disposing them.

Figure 5:
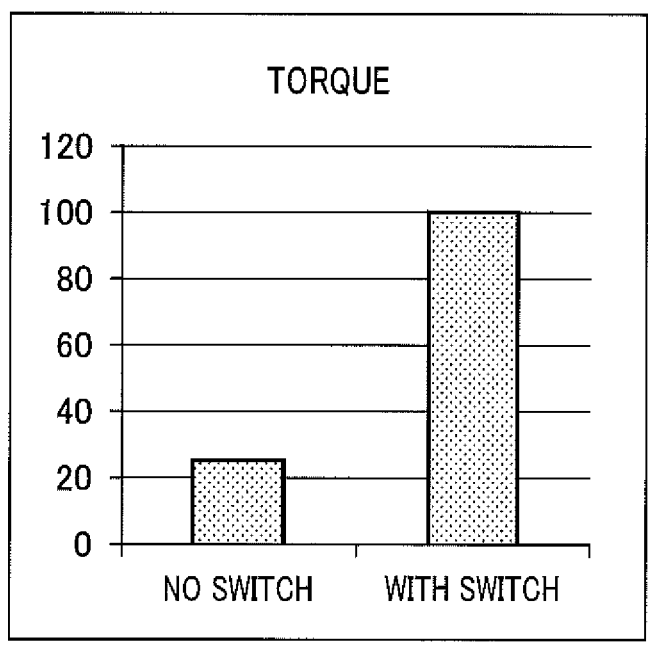
FIG. 5 shows a graph comparing torque in cases where a switching element is provided and not provided in the field winding type synchronous machine according to the first embodiment.

Further, when a magnitude of torque is examined in cases of disposing, as in the embodiment 1, and not disposing the switching element 36 and smoothing capacitor 37, results shown in FIG. 5 were obtained.

As apparent from FIG. 5, it is found that torque in the case of disposing the switching element 36 or the like is about 4.5 times more as compared with the case of not disposing them.

Second Embodiment

Although the basic configuration of a field winding type synchronous machine in a second embodiment is the same as that of the first embodiment, in the rotor 20 of the first embodiment, it differs from the first embodiment in that a permanent magnet 38 it is disposed between the interpole portion 24 and the stator 10.

Therefore, detailed descriptions about the members in common with the field winding type synchronous machine of the first embodiment are omitted, and details about different points and important points are described.

Note that the same reference numerals are given to members common to the first embodiment.

Figure 6:
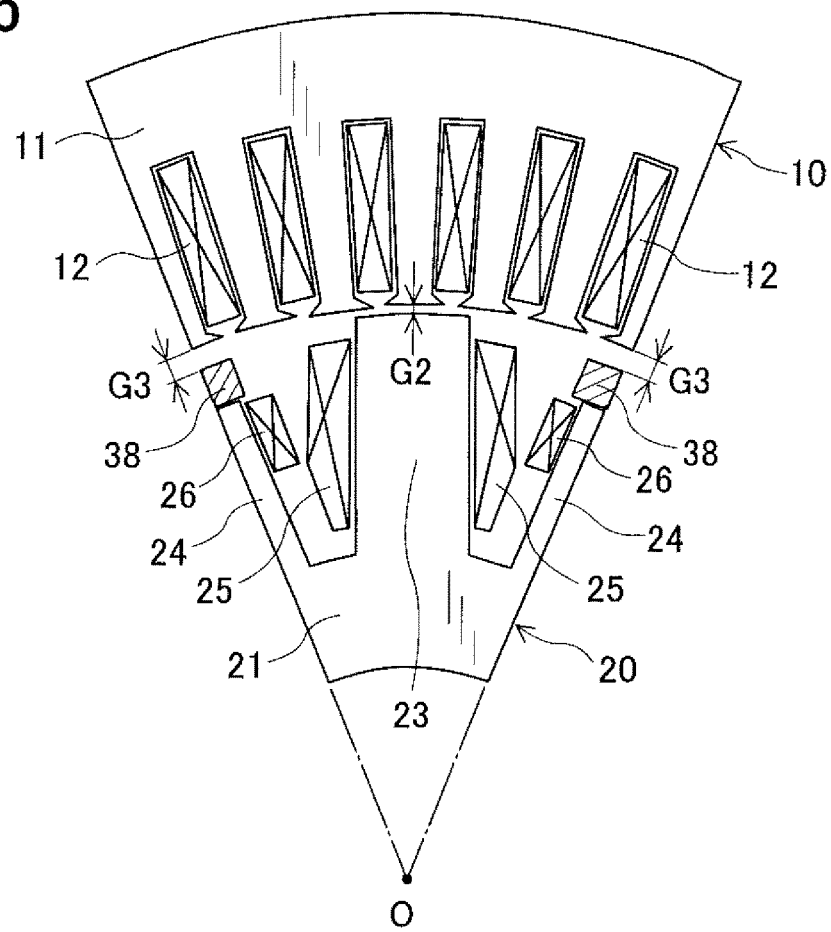
FIG. 6 shows a sectional view of a stator and a rotor of one magnetic pole taken along a direction perpendicular to an axis according to a second embodiment.

In the second embodiment, as shown in FIG. 6, the permanent magnets 38 are disposed one for every electromagnetic gap G1 formed between the interpole portion 24 and the stator 10.

Each permanent magnet 38 is disposed in a state close to an outer circumferential end face of the interpole portion 24 at a position shifted substantially 90 electrical degrees in a retarded direction from the main pole portion 23, and is disposed in a state of an opposite polarity to the polarity of main pole portion 23.

In this case, an electromagnetic gap G3 formed between the permanent magnet 38 and the stator 10 is larger than the electromagnetic gap G2 at the main pole portion 23.

That is, each permanent magnet 38 is disposed so as to bias the magnetic flux passing through the q-axis magnetic path originated from the AT (main current) of the stator coil 12.

Thereby, it is possible to increase a magnetic resistance to be more than that of iron or air, and since it is possible to further increase the magnetic flux of the interpole portion 24 using the magnetic flux of the permanent magnet 38, it is possible to improve excitation properties of the interpole windings 26.

According the field winding type synchronous machine of the second embodiment configured as above, the same functions and effects as the field winding type synchronous machine according to the first embodiment can be obtained.

Furthermore, since the permanent magnets 38 are disposed between the interpole portions 24 and the stator 10 in the second embodiment, it is possible to improve the excitation properties of the interpole windings 26.

Note that the permanent magnets 38 disposed in the electromagnetic gap G1 portion between the interpole portions 24 and the stator 10 may be disposed at a position shifted substantially 90 electrical degrees in a retarded direction from the main pole portion 23, and contrary to the above, in a state of the same polarity as the polarity of the main pole portion 23.

That is, by disposing the permanent magnets 38, an offset magnetic flux of a reverse bias is applied to the q-axis magnetic path.

In this case, when a load current is applied to the stator 10, the load current is utilized under a high steel magnetic permeability condition, and it is possible to amplify the excitation current in the interpole windings 26 relative to flux variations due to stator current pulsation.

That is, by reversing the bias, while relieving the magnetic flux saturation in the interpole portions 24, it is possible to convert the magnetic flux change due to the time harmonic current to the excitation current with high sensitivity at a position where magnetic properties of the steel sheet are excellent.

Figure 7:
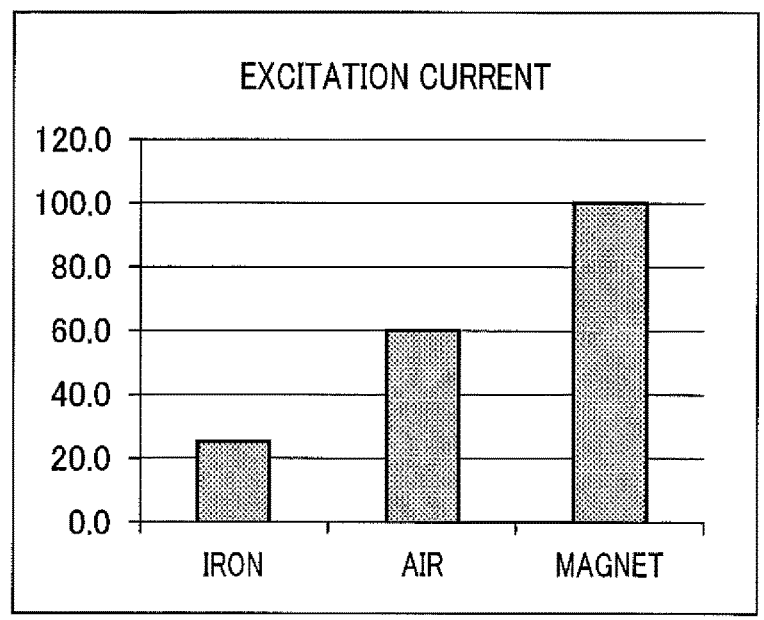
FIG. 7 shows a graph comparing an excitation current in cases where an electromagnetic gap portion of an interpole portion is replaced by iron, air, and permanent magnet in the field winding type synchronous machine according to the second embodiment.
Figure 8:
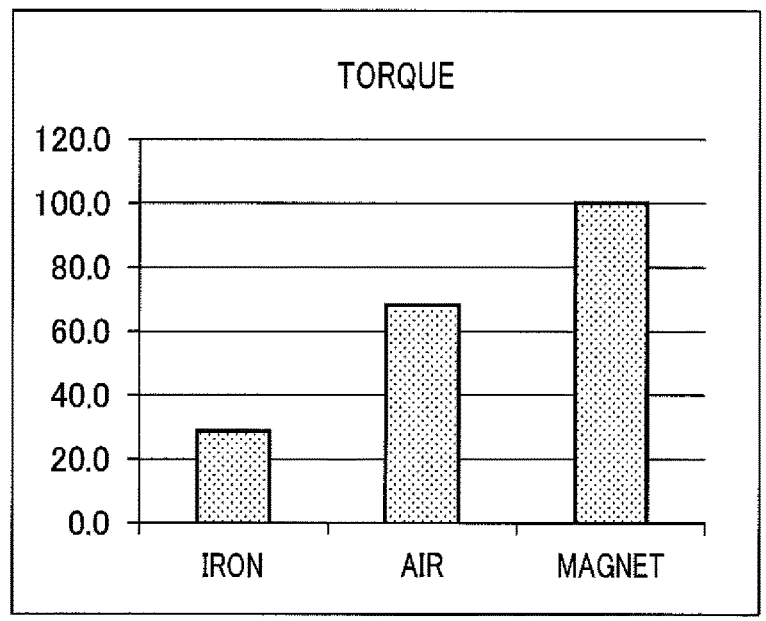
FIG. 8 shows a graph comparing torque in cases where an electromagnetic gap portion of an interpole portion is replaced by iron, air, and a permanent magnet in the field winding type synchronous machine according to the second embodiment.

Note that when the exciting current and torque are examined in cases of replacing the electromagnetic gap G1 at the interpole portion 24 in the field winding type synchronous machine according to second embodiment with iron, air, and the permanent magnet 38, results shown in FIG. 7 and FIG. 8 were obtained.

As apparent from FIGS. 7 and 8, when the permanent magnet 38 is disposed in the electromagnetic gap G1, the magnetic resistance can be increased more than a case of disposing iron, and since it is possible to increase the magnetic flux of the interpole portions 24 further by the magnetic flux of the permanent magnets 38, it is possible to improve the excitation properties (and torque) of the interpole windings 26.

[An Examination of the Excitation Properties Due to the Magnetic Resistance in the Magnetic Path of the Interpole Portion 24]

Figure 9:
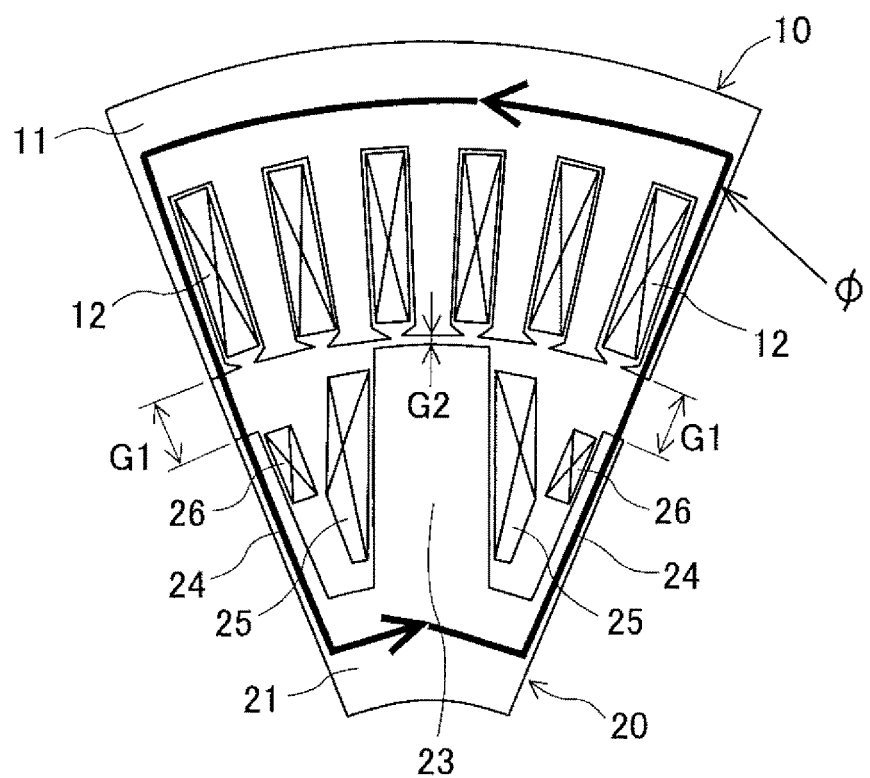
FIG. 9 is an explanatory view showing an interpole magnetic path formed in the stator and the rotor in the field winding type synchronous machine of the present disclosure.

FIG. 9 is an explanatory diagram that shows, a passage (q-axis magnetic path) of the magnetic flux φ passing through the interpole portion 24 originated from the AT (main current) of the stator coil 12 in the stator and rotor (FIG. 2) according to the first embodiment.

Figure 10:
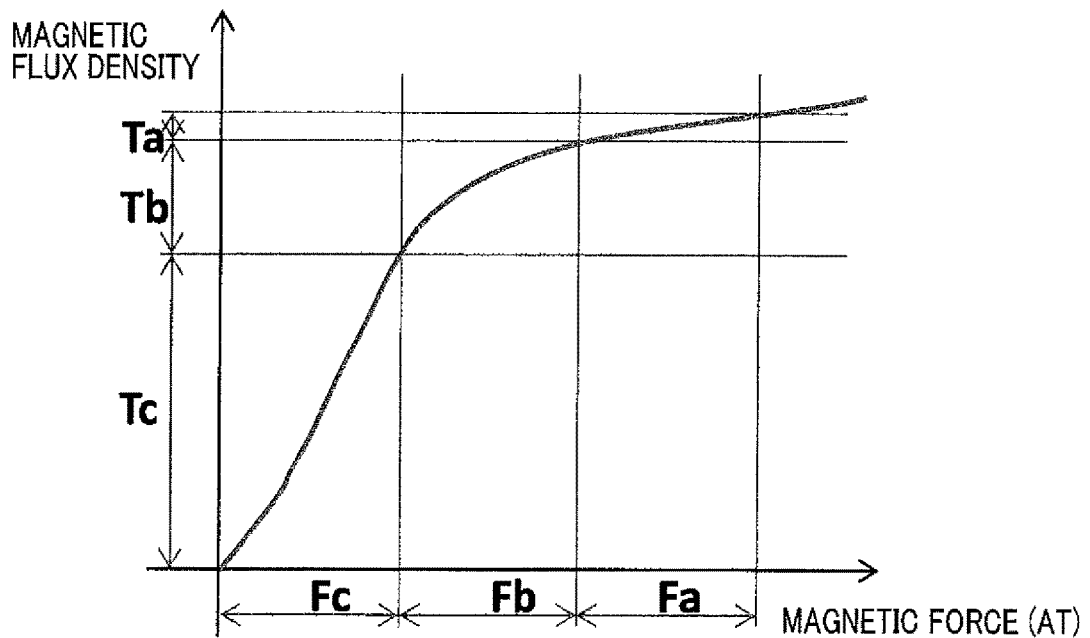
FIG. 10 is a graph showing a relationship between magnetizing force and magnetic flux density according to a gap distance of the interpole magnetic path in the field winding type synchronous machine of the present disclosure.

FIG. 10 is a graph showing a relationship between a magnetizing force according to a gap distance of an interpole magnetic path (q-axis magnetic path) and a magnetic flux density in FIG. 9.

Figure 11:
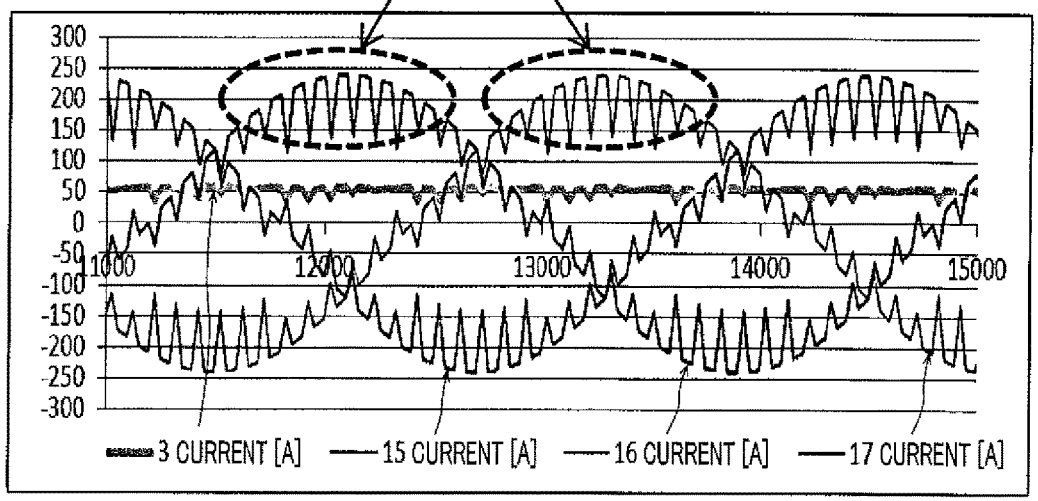
FIG. 11 shows a waveform diagram of a pulsating current for excitation in the field winding type synchronous machine of the present disclosure.

FIG. 11 is a waveform diagram of a pulsating current for excitation flowing through the interpole magnetic path (q-axis magnetic path).

Here, on the q-axis magnetic path shown in FIG. 9, the electromagnetic gap G1 formed between the interpole portion 24 and the stator 10 will be examined.

(1) When the electromagnetic gap G1 is small, the magnetic resistance is low, thus the magnetic circuit is saturated.

A magnetization operation range of the excitation pulsating current in this case is indicated by Fa, and an operating range of the magnetic flux density in this case is indicated by Ta.

(2) When the electromagnetic gap G1 is large, the magnetic resistance is large, thus the saturation of the magnetic circuit is relieved.

A magnetization operation range of the excitation pulsating current in this case is indicated by Fb, and an operating range of the magnetic flux density in this case is indicated by Tb.

(3) When inserting a permanent magnet in the electromagnetic gap G1, and when a magnetic field in the opposite direction to the AT (main current) of the stator coil 12 is provided as a bias, the saturation of the magnetic circuit is further relieved.

A magnetization operation range of the excitation pulsating current in this case is indicated by Fc, and an operating range of the magnetic flux density in this case is indicated by Tc.

As described above, by changing a magnetic circuit resistance of the magnetic flux ($\varphi$) according to conditions of the electromagnetic gap G1 even in the same magnetizing force, it is possible to improve the magnetic flux density to be applied, and it is possible to improve the excitation properties.

Third Embodiment

Although the basic configuration of a field winding type synchronous machine in a third embodiment is the same as that of the first embodiment, in the rotor 20 of the first embodiment, it differs from the first embodiment that interpole auxiliary windings 125a, 125b are added to the interpole portions 24 in the rotor rotation axis O side in the radial direction.

Since other configurations and the like are the same as the first embodiment, detailed descriptions are omitted, and about different points and important points are described.

Note that the same reference numerals are given to members common to the first embodiment.

Figure 12:
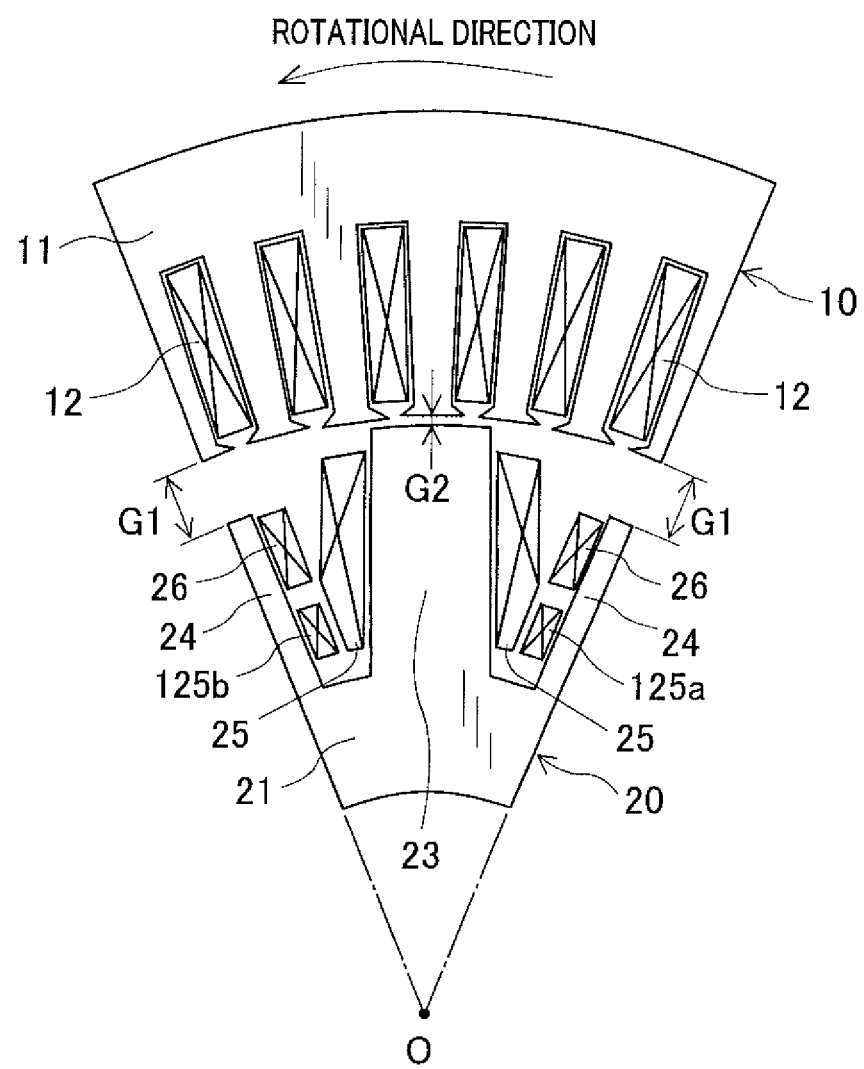
FIG. 12 shows a sectional view of a stator and a rotor of one magnetic pole taken along a direction perpendicular to an axis according to a third embodiment.
Figure 13:
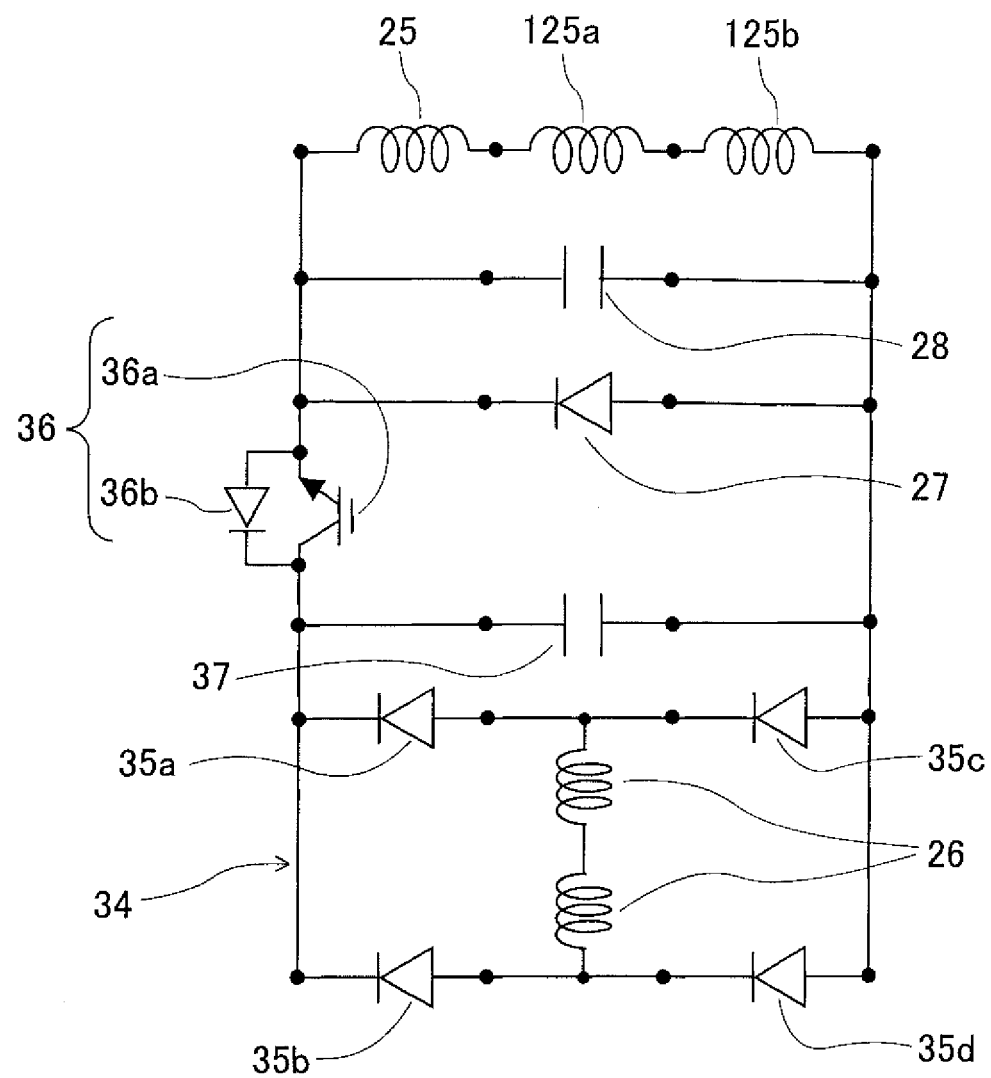
FIG. 13 shows a field circuit diagram of the field winding type synchronous machine according to the third embodiment.

In the rotor 20 of the third embodiment, as shown in FIGS. 12 and 13, the interpole auxiliary windings 125a, 125b are disposed on the interpole portions 24 of the rotor core 21 in the rotor rotational axis O side in the radial direction.

The interpole auxiliary windings 125a, 125b are disposed at positions shifted substantially 90 electrical degrees in the retarded direction from the main pole portion 23 in a state of the same polarity as the polarity of the main pole portion 23.

The interpole auxiliary windings 125a, 125b are connected in series to the main pole winding 25, and are connected such that a magnetic flux is produced in a direction that blocks the path of the flux ($\varphi$) (see FIG. 9) originated from the AT (main current) of the stator coil 12 in proportion to the current flowing in the main pole winding 25 being increased.

That is, one of the interpole auxiliary windings 125a is wound in the same winding direction as the main pole windings 25, and another one of the interpole auxiliary windings 125b is wound in a direction opposite to the main pole winding s25.

The interpole auxiliary windings 125a, 125b are wound at a fewer number of turns than the main pole windings 25.

According the field winding type synchronous machine of the third embodiment configured as above, the same functions and effects as the field winding type synchronous machine according to the first embodiment can be obtained.

Furthermore, in the third embodiment, while minimizing the required space, the magnetic flux of the AT (main current) of the stator coil 12 that passes through the interpole portions 24 is suppressed from flowing during high load conditions when the amount of excitation is large, and this enhances the excitation properties.

Other Embodiments

The present disclosure is not limited to the above embodiments; however, various modifications are possible within the scope of the present disclosure.

For example, in the above embodiment, although an example of applying the present disclosure to a field winding type synchronous machine of an inner rotor type has been described, the present disclosure can be applied to a field winding type synchronous machine of an outer rotor type.

What is claimed is:

1. A field winding type synchronous machine comprising:
a stator having a stator core having a stator coil formed of a plurality of distributed phase windings that forms a rotating magnetic field; and
a rotor that rotates while facing a peripheral surface of the stator with an electromagnetic gap therebetween; the rotor including:
a rotor core having a plurality of main pole portions projecting toward the stator that are spaced apart by a predetermined electrical angle pitch from each other and make a field magnetic flux flow to the stator core, and plurality of interpole portions projecting toward the stator that are spaced apart at roughly 90 degrees in electrical angle with respect to the main pole portions;
main pole windings wound around the main pole portions to form the field magnetic flux; and
interpole windings wound around the interpole portions to produce an induced current by a magnetic flux generated by a time harmonic current superimposed on a fundamental wave of the stator coil;
a rectifier circuit that rectifies the induced current to a field current and energizes the field current to the main pole winding; and
electromagnetic gaps between the interpole portions and a circumferential surface of the stator that are configured larger than electromagnetic gaps between the main pole portions and the circumferential surface of the stator; and
a switch that is disposed between the rectifier circuit and the main pole windings.

2. The field winding type synchronous machine according to claim 1, further comprising:

permanent magnets that are disposed between the interpole portions and the stator.

3. The field winding type synchronous machine according to claim 2, wherein,
the permanent magnets are disposed at positions shifted substantially 90 electrical degrees in a retarded direction from the main pole portions, and are disposed in a state of a same polarity as polarities of the main pole portions.

4. The field winding type synchronous machine according to claim 3, further comprising:
a switch that is disposed between the rectifier circuit and the main pole windings.

5. The field winding type synchronous machine according to claim 4, further comprising:
interpole auxiliary windings wound around the interpole portions, the interpole auxiliary windings being connected in series with the main pole windings.

6. The field winding type synchronous machine according to claim 5, wherein,
the interpole auxiliary windings are disposed at positions shifted substantially 90 electrical degrees in a retarded direction from the main pole portions, and are disposed in a state of a same polarity as polarities of the main pole portions.

7. The field winding type synchronous machine according to claim 3, further comprising:
interpole auxiliary windings wound around the interpole portions, the interpole auxiliary windings being connected in series with the main pole windings.

8. The field winding type synchronous machine according to claim 7, wherein,
the interpole auxiliary windings are disposed at positions shifted substantially 90 electrical degrees in a retarded direction from the main pole portions, and are disposed in a state of a same polarity as polarities of the main pole portions.

9. The field winding type synchronous machine according to claim 2, further comprising:
a switch that is disposed between the rectifier circuit and the main pole windings.

10. The field winding type synchronous machine according to claim 9, further comprising:
interpole auxiliary windings wound around the interpole portions, the interpole auxiliary windings being connected in series with the main pole windings.

11. The field winding type synchronous machine according to claim 10, wherein,
the interpole auxiliary windings are disposed at positions shifted substantially 90 electrical degrees in a retarded direction from the main pole portions, and are disposed in a state of a same polarity as polarities of the main pole portions.

12. The field winding type synchronous machine according to claim 2, further comprising:
interpole auxiliary windings wound around the interpole portions, the interpole auxiliary windings being connected in series with the main pole windings.

13. The field winding type synchronous machine according to claim 12, wherein,
the interpole auxiliary windings are disposed at positions shifted substantially 90 electrical degrees in a retarded direction from the main pole portions, and are disposed in a state of a same polarity as polarities of the main pole portions.

14. The field winding type synchronous machine according to claim 1, further comprising: interpole auxiliary windings wound around the interpole portions, the interpole auxiliary windings being connected in series with the main pole windings.

15. The field winding type synchronous machine according to claim 14, wherein,
the interpole auxiliary windings are disposed at positions shifted substantially 90 electrical degrees in a retarded direction from the main pole portions, and are disposed in a state of a same polarity as polarities of the main pole portions.

16. The field winding type synchronous machine according to claim 1, further comprising:
interpole auxiliary windings wound around the interpole portions, the interpole auxiliary windings being connected in series with the main pole windings.

17. The field winding type synchronous machine according to claim 16, wherein,
the interpole auxiliary windings are disposed at positions shifted substantially 90 electrical degrees in a retarded direction from the main pole portions, and are disposed in a state of a same polarity as polarities of the main pole portions.

* * * * *